United States Patent [19]
Lin

[11] Patent Number: 5,919,001
[45] Date of Patent: Jul. 6, 1999

[54] PROCESS FOR SIMULTANEOUSLY REMOVING LEAD, COPPER AND MERCURY FROM CONTAMINATED SOILS

[76] Inventor: Hsing Kuang Lin, 2143 Bridgewater Dr., Fairbanks, Ak. 99709-4104

[21] Appl. No.: 08/670,770

[22] Filed: Jun. 21, 1996

[51] Int. Cl.$^6$ .............. A62D 3/00; B09C 1/02; B09C 1/08
[52] U.S. Cl. .............. 405/128; 210/912; 210/914; 588/236
[58] Field of Search .............. 210/711, 912, 210/914; 405/128; 588/236

[56] References Cited

U.S. PATENT DOCUMENTS

| | | | |
|---|---|---|---|
| 5,045,240 | 9/1991 | Skriba et al. | 588/7 |
| 5,268,128 | 12/1993 | Lahoda et al. | 588/20 |
| 5,466,426 | 11/1995 | Fristad et al. | 423/98 |
| 5,494,649 | 2/1996 | Fristad et al. | 423/98 X |
| 5,640,701 | 6/1997 | Grant et al. | 588/1 |
| 5,744,107 | 4/1998 | Fristad et al. | 423/1 |

*Primary Examiner*—George Suchfield
*Attorney, Agent, or Firm*—R. Russel Austin

[57] ABSTRACT

A method for treating a quantity of soil contaminated with lead, copper or mercury includes mixing the contaminated soil with an acid, chloride solution, to dissolve the contaminants in the chloride solution. Soil, essentially free of the contaminants, is separated from contaminant-containing chloride solution. Contaminants are precipitated from the contaminant-containing chloride solution by addition of one or more sulfides. Precipitated contaminants are separated from the remaining solution. The remaining solution may treated by adding chloride, acid, ORP adjusting agents and used to treat an additional quantity of soil.

4 Claims, 1 Drawing Sheet

5,919,001

PROCESS FOR SIMULTANEOUSLY REMOVING LEAD, COPPER AND MERCURY FROM CONTAMINATED SOILS

TECHNICAL FIELD OF THE INVENTION

The present invention relates generally to methods for treating soil contaminated with lead (Pb), copper (Cu) or mercury (Hg). The invention relates in particular to a method for removing from soil contaminants including, lead, copper, and mercury, or oxides and carbonates thereof, alone or in any combination.

DISCUSSION OF BACKGROUND ART

There are many mining and industrial sites in which soil is contaminated with one or more of Pb, Cu or Hg. The Pb, Cu, or Hg contaminants may be in the form of metals, or compounds of the metals, all of which are toxic to humans in some degree. The form that contaminants take depends on their origin, the environment in which they are found, and the length of time they have been exposed to this environment.

When such contaminants are in the soil in the form of relatively large particles, for example, greater than about 65 mesh, the soil may be treated by soil washing techniques. Typically, however, the contaminants are in the form of particles of smaller size.

When the contaminants are in the form of relatively small particles, soil washing techniques are not practical. In such cases soil treatments typically include solidification, vitrification and capping. Such techniques, however, do not remove the contaminants, but merely trap them in the soil in a way that they can not leach out into water sources and the like where they could pose a danger for humans. As such, these treatments may be considered less than ideal. These treatments also usually require a high temperature, and are thus generally energy intensive and expensive.

SUMMARY OF THE INVENTION

The present invention is directed to a method for treating soil contaminated by contaminants which include one or more of the group of metals consisting of lead, mercury and copper. The method is simple, does not require high temperatures, and provides that most reagents used therein are recoverable. This provides for relatively low cost operation, and for avoiding a secondary problem of safely disposing of reagents or by-products thereof.

In one aspect of the present invention, the method comprises providing an aqueous solution including chloride ions. The chloride solution is mixed with a quantity of the contaminated soil to form a solid-liquid mixture. In the solid-liquid mixture, any Pb, Cu, and Hg contaminants in the soil dissolve in the chloride solution and the soil becomes essentially free of these contaminants. The contaminant-free soil is then separated from the contaminant-containing chloride solution.

The aqueous chloride solution is preferably acidic. A pH between about 0.0 and 3.5 being preferable. Chloride ion concentration is preferably between about 0.1 an 6.0 moles/liter. Oxidation/Reduction potential (ORP) is preferably between about 0.02 and 1.2 Volts (V).

In another aspect of the present invention, the contaminant containing chloride solution is treated with one or more sulfides, thereby precipitating the dissolved contaminants as solids and forming another solid-liquid mixture including these precipitated solids and a contaminant-free aqueous solution. The precipitated solids are separated from the solid-liquid mixture and may be safely shipped to a smelter for metal recovery.

Preferred sulfides include calcium and sodium sulfides. However, almost any sulfide in solid, liquid, solution, or gaseous form may be used in the above discussed precipitation step.

In yet another aspect of the present invention, at least a portion of the contaminant-free aqueous solution, once separated from the precipitated solids, may be adjusted to a chloride ion concentration, pH and ORP, such that is useful as a chloride solution for mixing with a further quantity of contaminated soil. This aspect of the invention is advantageous in providing that a substantial portion of reagents used in the process are recoverable.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
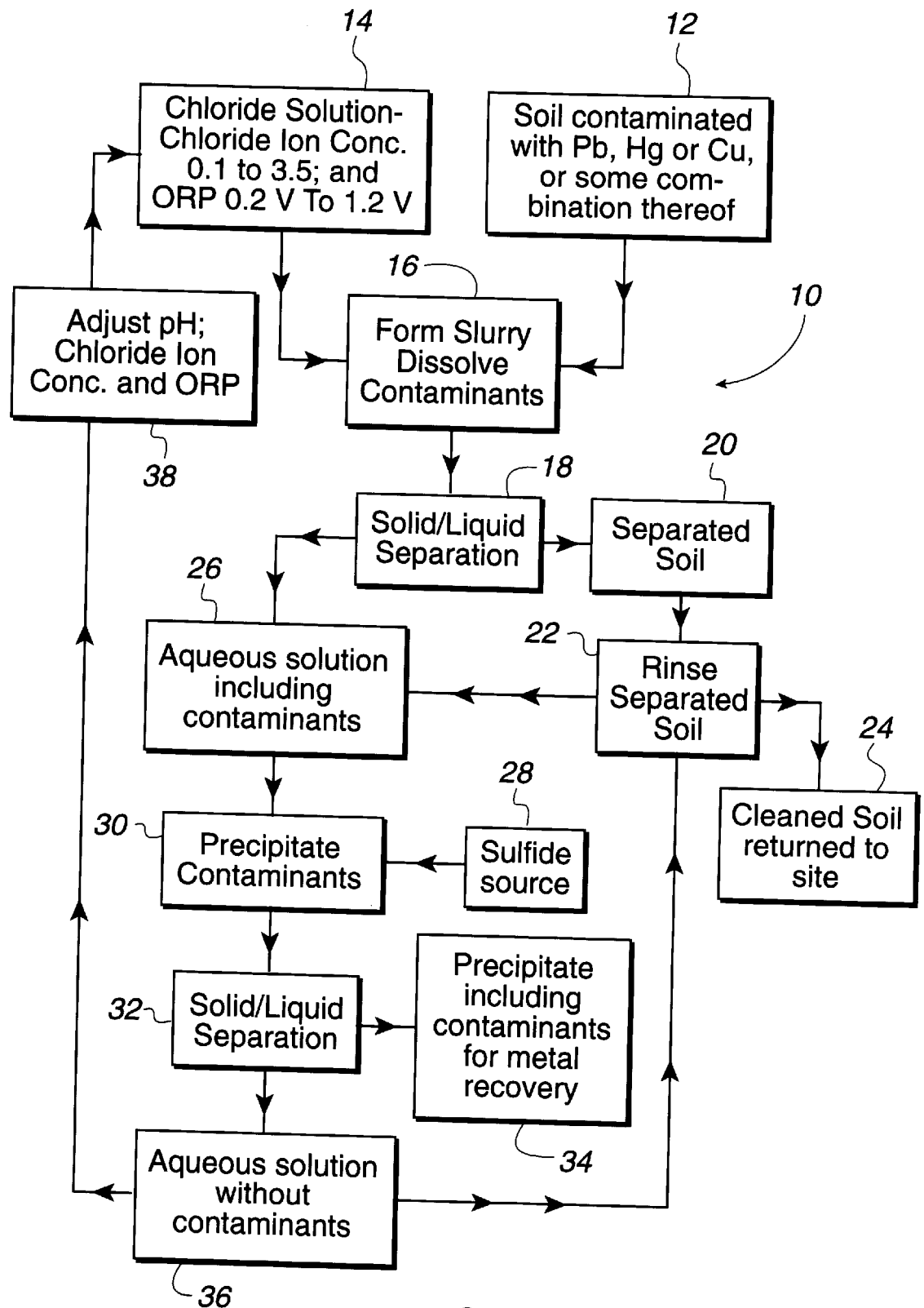
FIG. 1 is a flow chart schematically illustrating a preferred embodiment of the soil treatment method of the present invention.

Referring now to FIG. 1, a preferred embodiment 10 of a the soil treatment method of the present invention is described in FIG. 1. Soil contaminated with Pb, Cu, or Hg (box 12) is mixed with a aqueous chloride solution (box 14). The Pb, Cu and Hg may be present in metallic form or in a the form a compound, for example, an oxide or carbonate. The aqueous chloride solution is preferably an acid solution, most preferably having a pH between about 0.0 and 3.5. The aqueous chloride solution preferably has an ORP between about 0.02 V and 1.2 V. Chloride ion concentration is preferably between about 0.1 and 6.0 mole/liter. A preferred solution includes sodium chloride or calcium chloride. Solution pH is reduced by addition of hydrochloric acid or nitric acid. ORP is preferably controlled by addition of sodium hypochlorite or hydrogen peroxide. Selection of specific pH, ORP and chloride ion concentration values within these ranges will depend on factors such as the ratio of volume of soil treated to aqueous chloride solution and the extent of contamination.

The mixture of soil and aqueous chloride solution forms a slurry or solid-liquid mixture (box 16). In the slurry, contaminants in the soil eventually dissolve in the aqueous chloride solution leaving the soil in the slurry essentially free of Pb, Cu or Hg. The term "essentially" as used herein meaning that remaining contaminants, if any, are below a hazardous level. Such a level may be set by federal, state or local regulations.

The above-described dissolution process may be performed in any suitable reaction vessel. It is important, however, that during the dissolution process, the slurry is at least periodically agitated and, preferably, continuously agitated. The slurry is preferably maintained at a temperature between about one and seventy degrees Centigrade (°C.) during the dissolution process.

Once dissolution of contaminants is essentially complete, the essentially Pb, Cu and Hg free soil is separated from the liquid (box 18). Preferably, the separated soil (box 20) is rinsed (box 22) to remove any remaining contaminant in solution form before being returned to the site from whence it came (box 24), or transported to any other location.

At this point in the method of the present invention, essentially Pb, Cu and Hg free soil has been produced but a solution containing these contaminants remains to be dealt with (box 26). One method of treating this solution is set forth below.

One or more sulfides (box 28) are added to the contaminant-containing solution. This addition of sulfides precipitates the contaminants (box 30) from the contaminant-containing solution forming a solid-liquid mixture including precipitated solids containing any Pb, Cu or Hg, and an aqueous solution essentially free of Pb, Cu and Hg.

Preferably, any rinse-solution resulting from the above-described rinsing step is added to the separated contaminant-containing solution before the above-described precipitation step. It is also preferable that the pH of the separated contaminant-containing solution, whether or not it is mixed with rinse solution, is adjusted to a value greater than 1.5 before the precipitation step. Adjusting pH may be done with lime or a similar pH adjusting reagent.

Preferably. calcium sulfide or sodium sulfide is used for the precipitation step, although the use of any other sulfide ion releasing reagents in solid, liquid, solution, or gaseous form is not precluded. A preferred group of sulfides includes the group consisting of sodium sulfide, calcium sulfide, hydrogen sulfide, and thioacetamide. Agitation is also preferable, at least periodically and preferably continuously, during the precipitation step. Preferably, the solid-liquid mixture temperature is maintained at between 1° C. and 70° C. during the precipitation step.

Once precipitation is complete, solids including any Pb, Cu, and Hg contaminants may be separated from the remaining, essentially Pb, Cu, and Hg-free solution, by filtration, settling, centrifuging or the like (box 32). These separated solids may be transported to a smelting facility for metal recovery (box 34).

At least a portion of the separated, contaminant-free solution (box 36) may then be treated with suitable reagents in order to restore its pH, ORP and chloride ion concentration (box 38) into above-described ranges which make it suitable as a chloride solution for treating additional quantities of soil (box 14). By way of example, chloride ion concentration may be adjusted by addition or sodium chloride or calcium chloride; pH may be adjusted by adding hydrochloric or nitric acid; and ORP may be adjusted by adding ferric chloride, sodium hypochlorite, or hydrogen peroxide. These examples should not be considered exhaustive.

Finally, but not exhaustively, some other portion of the separated, contaminant-free solution may be used for rinsing (box 22) soil separated from contaminant-containing solution. This portion of the solution does not need to be treated in any way in order to be effective in this rinsing step.

It is emphasized here that the term "contaminant-free" is used in this specification and the appended claims for convenience or brevity of description and refers only to Pb, Cu and Hg containing contaminants. No representation is made that this process is effective in removing any other heavy metal contaminants.

The present invention has been described and depicted as a preferred embodiment. The embodiment however is not limited to the embodiment described and depicted. Rather, the invention is defined by the claims appended hereto.

What is claimed is:

1. A method for treating soil contaminated by contaminants which include mercury and one or more of the group of metals consisting of lead and copper, the method comprising the steps of:

(a) providing a first aqueous solution including chloride ions, an acid and an oxidant, said aqueous solution having a chloride ion concentration between about 0.1 and 6.0 mole/liter; a pH between about 0.0 and 3.5; and an ORP between about 0.02 and 1.2 Volts, and said oxidant being selected from the group of oxidants consisting of sodium hypochlorite and hydrogen peroxide;

(b) mixing a quantity of the contaminated soil with said first aqueous solution to form a first solid-liquid mixture including essentially contaminant-free soil and a second aqueous solution including the contaminants;

(c) separating said essentially contaminant-free soil from said second aqueous solution.

2. The method of claim 1 further including the step of (d) adding one or more sulfides to said second aqueous solution to form a second solid-liquid mixture including precipitated solids containing the contaminants, and a second aqueous solution essentially free of contaminants; and (e) separating said precipitated solids from said second aqueous solution.

3. The method of claim 1 wherein said aqueous solution includes at least one of sodium chloride and calcium chloride.

4. The method of claim 1 wherein said acid includes at least one of hydrochloric acid and nitric acid.

* * * * *